(12) United States Patent
Hunter et al.

(10) Patent No.: US 11,060,836 B2
(45) Date of Patent: Jul. 13, 2021

(54) BEARING ARRANGEMENT

(71) Applicant: RENISHAW PLC, Wotton-under-Edge (GB)

(72) Inventors: Stephen Paul Hunter, Chipping Sodbury (GB); David Andrew Larkham, Bristol (GB)

(73) Assignee: RENISHAW PLC, Wotton-under-Edge (GB)

(*) Notice: Subject to any disclaimer, the term of this patent is extended or adjusted under 35 U.S.C. 154(b) by 117 days.

(21) Appl. No.: 16/493,929

(22) PCT Filed: Apr. 17, 2018

(86) PCT No.: PCT/GB2018/050993
§ 371 (c)(1),
(2) Date: Sep. 13, 2019

(87) PCT Pub. No.: WO2018/193227
PCT Pub. Date: Oct. 25, 2018

(65) Prior Publication Data
US 2020/0080830 A1 Mar. 12, 2020

(30) Foreign Application Priority Data

Apr. 19, 2017 (EP) .................................. 17275052
Jul. 21, 2017 (EP) .................................. 17275115

(51) Int. Cl.
*G01B 5/008* (2006.01)
*G01B 5/00* (2006.01)
(52) U.S. Cl.
CPC ......... *G01B 5/0009* (2013.01); *G01B 5/0004* (2013.01); *G01B 5/008* (2013.01)

(58) Field of Classification Search
CPC .............................. G01B 5/008; G01B 5/0009
USPC .......................................................... 33/503
See application file for complete search history.

(56) References Cited

U.S. PATENT DOCUMENTS

| 2,516,020 | A | 7/1950 | Reed |
| 2,789,480 | A | 4/1957 | Wellauer |
| 3,681,979 | A | 8/1972 | Hammond, Jr. |
| 3,749,501 | A | 7/1973 | Wieg |
| 3,818,596 | A | 6/1974 | Stemple et al. |
| 3,831,283 | A | 8/1974 | Pagella et al. |
| 4,138,822 | A | 2/1979 | Parodi et al. |
| 4,207,680 | A | 6/1980 | Bell et al. |

(Continued)

FOREIGN PATENT DOCUMENTS

| CN | 2627338 Y | 7/2004 |
| CN | 202018286 U | 10/2011 |

(Continued)

OTHER PUBLICATIONS

New machine Translation of DE102016101695 A1.

(Continued)

*Primary Examiner* — George B Bennett
(74) *Attorney, Agent, or Firm* — Oliff PLC

(57) ABSTRACT

A positioning apparatus including a moveable member moveable along a bearing guideway in a first dimension, the moveable member including at a first end thereof at least first and second bearing members which are preloaded against corresponding first and second sides of a concave corner of the bearing guideway.

18 Claims, 9 Drawing Sheets

(56) References Cited

U.S. PATENT DOCUMENTS

| | | |
|---|---|---|
| 4,213,244 A | 7/1980 | Bell et al. |
| 4,229,136 A | 10/1980 | Panissidi |
| 4,389,781 A | 6/1983 | Donaldson |
| 4,507,868 A | 4/1985 | Tuss |
| 4,651,439 A | 3/1987 | Band et al. |
| 4,680,868 A | 7/1987 | Orr et al. |
| 4,799,316 A | 1/1989 | Tuss |
| 4,852,267 A | 8/1989 | Tezuka |
| 4,882,847 A | 11/1989 | Hemmelgarn et al. |
| 4,949,465 A | 8/1990 | Pesikov |
| 4,964,220 A | 10/1990 | Orr et al. |
| 5,063,683 A | 11/1991 | Bury |
| 5,094,549 A | 3/1992 | Lyon |
| 5,125,163 A | 6/1992 | Bury |
| 5,173,613 A | 12/1992 | Henry et al. |
| 5,208,994 A | 5/1993 | McMurtry et al. |
| 5,247,749 A | 9/1993 | Bury |
| 5,287,629 A | 2/1994 | Pettersson |
| 5,388,342 A | 2/1995 | Garau et al. |
| 5,388,343 A | 2/1995 | Garau et al. |
| 5,402,981 A | 4/1995 | McMurtry |
| 5,505,004 A | 4/1996 | Pettersson |
| 5,621,978 A | 4/1997 | Sarauer |
| 5,758,429 A | 6/1998 | Farzan et al. |
| 5,832,416 A | 11/1998 | Anderson |
| 5,848,480 A | 12/1998 | Sola et al. |
| 6,050,048 A | 4/2000 | Hellsten |
| 6,058,618 A | 5/2000 | Hemmelgarn et al. |
| 6,161,298 A | 12/2000 | Bernhardt et al. |
| 6,202,316 B1 | 3/2001 | Swift et al. |
| 6,397,485 B1 | 6/2002 | McMurtry |
| 6,834,471 B2 | 12/2004 | Takagi et al. |
| 7,191,541 B1 | 3/2007 | Weekers et al. |
| 7,533,574 B2 | 5/2009 | McMurtry et al. |
| 8,375,594 B1 | 2/2013 | Guenther |
| 8,739,420 B2 | 6/2014 | Tarizzo |
| 9,038,282 B2 | 5/2015 | McMurtry et al. |
| 9,109,747 B2 | 8/2015 | Schernthaner |
| 2003/0037451 A1 | 2/2003 | Sarauer |
| 2003/0218457 A1 | 11/2003 | Aiba et al. |
| 2004/0250434 A1 | 12/2004 | Ogura et al. |
| 2004/0250503 A1 | 12/2004 | Bigelow |
| 2005/0097766 A1 | 5/2005 | Weekers et al. |
| 2007/0040453 A1 | 2/2007 | Aoki et al. |
| 2007/0220767 A1 | 9/2007 | Pettersson |
| 2010/0018153 A1 | 1/2010 | Garau |
| 2011/0102808 A1* | 5/2011 | Verdi .................. G01B 21/045 356/614 |
| 2012/0041712 A1 | 2/2012 | Pettersson |
| 2015/0028699 A1 | 1/2015 | Hofstetter et al. |
| 2017/0227050 A1* | 8/2017 | Poglitsch ............ F16C 32/0625 |
| 2017/0322016 A1* | 11/2017 | Kanno ................ G01D 5/34746 |
| 2018/0149473 A1* | 5/2018 | Sprenger ............... G05B 19/402 |
| 2018/0266817 A1* | 9/2018 | Kashiwabuchi ....... G01B 21/20 |
| 2018/0304276 A1* | 10/2018 | Hunter .................. G01B 21/04 |
| 2018/0309354 A1* | 10/2018 | Angood ............... G01B 21/047 |
| 2019/0107378 A1* | 4/2019 | Meile ..................... G01B 5/008 |
| 2020/0149859 A1* | 5/2020 | Brown ................... G01B 5/012 |
| 2020/0182599 A1* | 6/2020 | Derrick ............... G01B 21/045 |

FOREIGN PATENT DOCUMENTS

| | | |
|---|---|---|
| CN | 101563510 B | 9/2014 |
| CN | 203881315 U | 10/2014 |
| DE | 3107783 A1 | 9/1982 |
| DE | 4132655 A1 | 4/1993 |
| DE | 4325337 A1 | 2/1994 |
| DE | 44 08 912 A1 | 12/1994 |
| DE | 4345094 A1 | 7/1995 |
| DE | 29705152 U1 | 7/1997 |
| DE | 3927525 C2 | 3/1998 |
| DE | 10055188 A1 | 5/2002 |
| DE | 10215188 A1 | 10/2003 |
| DE | 103 26 247 A1 | 1/2005 |
| DE | 102004047525 A1 | 4/2006 |
| DE | 102006027898 B3 | 7/2007 |
| DE | 10 2013 219 487 A1 | 4/2015 |
| DE | 10 2016 101 695 A1 | 8/2016 |
| EP | 0589565 A2 | 3/1994 |
| EP | 0957332 A2 | 11/1999 |
| EP | 1 018 669 A2 | 7/2000 |
| EP | 1 347 337 A2 | 9/2003 |
| EP | 1 463 185 A2 | 9/2004 |
| EP | 1500903 A1 | 1/2005 |
| EP | 1500903 B1 | 5/2012 |
| EP | 2 089 592 B1 | 1/2013 |
| EP | 3 032 218 A1 | 6/2016 |
| EP | 1854577 B1 | 6/2016 |
| FR | 1397480 A | 4/1965 |
| GB | 2095143 A | 9/1982 |
| GB | 2 262 319 B | 3/1995 |
| JP | S61-90850 A | 5/1986 |
| JP | S64-35310 A | 2/1989 |
| JP | H05-312556 A | 11/1993 |
| JP | H08-114442 A | 5/1996 |
| JP | 2003-309963 A | 10/2003 |
| SU | 1167413 A1 | 7/1985 |
| WO | 87/07711 A1 | 12/1987 |
| WO | 88/02471 A1 | 4/1988 |
| WO | 89/09677 A1 | 10/1989 |
| WO | 89/09887 A1 | 10/1989 |
| WO | 91/03145 A1 | 3/1991 |
| WO | 01/85403 A1 | 11/2001 |
| WO | 2005/043552 A1 | 5/2005 |
| WO | 2007/093789 A1 | 8/2007 |
| WO | 2007/128431 A2 | 11/2007 |
| WO | 2007/144906 A1 | 12/2007 |
| WO | 2010/106079 A1 | 9/2010 |

OTHER PUBLICATIONS

Pinkui, Luo, "A Thesis Submitted in Partial Fulfillment of the Requirements for the Degree of Master of Egineering", Study on Motion Control of H-type Stage Driven by Dual Linear Motors, Huazhong Universit of Science and Technology Wuhan, Hubei 430074, P. R. China, Dec. 2011.

Oct. 4, 2017 Extended Search Report issued in European Patent Application No. 17275052.3.

Jan. 15, 2018 Extended Search Report issued in European Patent Application No. 17275115.8.

May 25, 2018 Search Report issued in International Patent Application No. PCT/GB2018/050993.

May 25, 2018 Written Opinion issued in International Patent Application No. PCT/GB2018/050993.

"Linear Ball Bushings"; Automotion Components brochure; automotioncomponents.co.uk; pp. 544-609.

Thomson; "Thomson RoundWay Linear Roller Bearings"; Thomson brochure; www.thompsonlinear.com; pp. 1-6.

Thompson; "RoundWay Roller Bearings"; Thomson web page; http://www.thomsonlinear.com/website/com/eng/products/linear_guides/linear_specialty; [retrieved Sep. 5, 2014].

Connelly, R.; "The basics of rigidity: Lectures I and II, Session on Granlular Matter Institut Henri Poincaré"; Cornell University; http://www.math.cornell.edu/~connelly/BasicsI.BasicsII.pdf.

Ziegert, John; "Design and Testing of a High Speed, 5-DOF, Coordinate Measuring Machine with Parallel Kinematic Structure"; University of Florida; pp. 1-4.

"I-beam"; Wikipedia article; pp. 1-5; https://en.wikipedia.org/wiki/I-beam; accessed Jan. 24, 2019.

"Revolution CMM Models"; Advanced Industrial Measurement Systems; pp. 1-10; http://aimsmetrology.com/revolution-cmm-models/; webpage from Apr. 18, 2016; [retrieved Jan. 31, 2019].

Renishaw plc; "Equator 300 gaging system"; Renishaw datasheet H-5504-8200-01; www.renishaw.com; 2010.

Renishaw plc; "Equator versatile gauge with MODUS software"; Renishaw brochure H-5504-8200-07-A; www.renishaw.com; 2015.

Oct. 27, 2017 Search Report issued in European Patent Application No. 17275054.9.

(56) References Cited

OTHER PUBLICATIONS

Sep. 19, 2018 Extended Search Report issued in European Patent Application No. 18167645.3.
Oct. 6, 2017 Search Report issued in European Patent Application No. 17275053.1.
May 25, 2018 Search Report issued in European Patent Application No. 18167707.1.
Nov. 29, 2017 Search Report issued in European Patent Application No. 17275114.1.
Oct. 4, 2017 Search Report issued in European Patent Application No. 17275052.3.
May 25, 2018 Search Report and Written Opinion issued in International Patent Application No. PCT/GB2018/050996.
Ferranti 750B Machine—first known to the public before Apr. 19, 2017.
Brown & Sharpe Validator Chameleon Machine—first known to the public before Apr. 19, 2017.
Johansson Saphir CMM Machine—first known to the public before Apr. 19, 2017.

* cited by examiner

BEARING ARRANGEMENT

This invention relates to a bearing arrangement, in particular to a bearing arrangement for a positioning apparatus, such as a coordinate measuring machine (CMM).

A positioning apparatus, such as a CMM, can comprise one or more members that are moveable relative to each other for positioning a tool, such as an inspection device, relative to a workpiece/artefact. For example, a CMM traditionally comprises a plurality of moveable members, e.g. linearly moveable members arranged in series. Generally, positioning apparatus are configured to facilitate relative motion of a tool and/or object in at least two or three mutually orthogonal dimensions, e.g. X, Y and Z. Such positioning apparatus are commonly known as "Cartesian" positioning apparatus (or Cartesian CMM). Typical Cartesian coordinate positioning apparatus include Bridge, Portal, Cantilever, Horizontal Arm, and Gantry type machines.

Relative motion between the moveable members of a CMM is facilitated by bearing arrangements, for example by air bearings and/or mechanical bearings. Typically, a bearing comprises a track or guideway along which a bearing member, such as an air-bearing pad or ball-bearing assembly for example, can travel. U.S. Pat. No. 5,388,342 describes an example air-bearing arrangement for a CMM.

The present invention relates to an improved bearing configuration for a positioning apparatus, in particular, for a coordinate positioning apparatus such as a coordinate measuring machine (CMM).

This application describes a positioning apparatus comprising a moveable member which is moveable along a (e.g. first) bearing guideway in a first degree of freedom. The moveable member comprises at least first and second bearing members which are preloaded (in other words, biased) against (e.g. corresponding first and second bearing surfaces of) the bearing guideway. The apparatus is configured such that (e.g. the direction of) the resultant reaction forces on the first and second bearing members to the preload converge. In other words, the apparatus is configured such that, in a (notional) two dimensional coordinate system perpendicular to the first dimension (in other words, when projected into a two dimensional coordinate system perpendicular to the first dimension), the resultant reaction force to the preload on the first bearing member and the resultant reaction force to the preload on the second bearing member intersect. For example, the apparatus is configured such that the resultant reaction force to the preload on the first bearing member and the resultant reaction force to the preload on the second bearing member substantially intersect each other or intersect a common line that extends parallel to the first degree of freedom (which could be referred to as the "common line of the first bearing assembly", or "first common line"). As described in more detail below, the resultant reaction force to the preload on the first bearing member and the resultant reaction force to the preload on the second bearing member could substantially intersect in a three dimensional coordinate system. Any of aforementioned could be achieved, for example, by providing first and second air bearing members which bear against substantially planar bearing surfaces which form an inside (in other words "concave") corner feature on the bearing guideway.

According to a first aspect of the invention there is provided a positioning apparatus comprising a moveable member moveable along a (e.g. first) bearing guideway in a first dimension, the moveable member comprising at a first end thereof at least first and second (e.g. datum) bearing members which are preloaded (biased) against (e.g. corresponding first and second bearing surfaces of) the bearing guideway, configured such that in a (notional) two dimensional coordinate system, for instance a two dimensional Cartesian coordinate system, perpendicular to the first dimension (in other words: "in second and third dimensions perpendicular to the first dimension" or "when projected into a two dimensional coordinate system perpendicular to the first dimension"), the resultant reaction force to the preload on the first bearing member and the resultant reaction force to the preload on the second bearing member intersect. In other words, the apparatus is configured such that in a two dimensional coordinate system perpendicular to the first dimension, the line of the resultant reaction force to the preload on the first bearing member and the line of the resultant reaction force to the preload on the second bearing member intersect.

Configuring the bearing in such a way can facilitate numerous improvements in the positioning apparatus, and for instance can help to improve the load bearing efficiency of the moveable member. For example, as explained in more detail below, such a configuration can facilitate an improvement in the stiffness-to-mass/weight ratio of the moveable member and/or of the bearing assemblies. It can also help to avoid moments being imparted into the moveable member's metrology loop/structure.

As will be understood, (e.g. the line of) a resultant reaction force on the first/second bearing member can be the (line of the) resultant reaction force on the first/second bearing member which is imparted into the moveable member. As will be understood, the (lines of the) resultant reaction forces have a direction (which will point away from the surface against which the corresponding bearing member bears). Accordingly, it could be said that the directions of the resultant reaction forces on the first and second bearing members converge/intersect (e.g. substantially each other or said common line). Accordingly, as will be understood, the point at which the resultant reaction forces intersect in said two dimensional coordinate system (or in other words substantially intersect each other or said common line) will be located on the same side of the bearing guideway as the first and second bearing members.

As will be understood, the first and second bearing members could be part of a bearing assembly, for example part of a datum bearing assembly. The moveable member could comprise a plurality of (e.g. at least first and second) bearing assemblies located at the first end of the moveable member. Accordingly, the at least first and second bearing members could be part of a first (e.g. datum) bearing assembly. The first and second bearing assemblies could be located at spatially separate locations along the first dimension. For example, the first bearing assembly could be located toward a first side (e.g. front side) of the moveable member, and the second bearing assembly could be located toward a second side (e.g. back side) of the moveable member.

The first and second bearing members could be mounted to the moveable member such that they do not impart a substantial bending moment on the moveable member, for example about an axis perpendicular to the first dimension and/or about an axis parallel to the first dimension. For example, they could be substantially co-located along the first dimension, so as not to impart a substantial bending moment on the moveable member. For example, the first and second bearing members could be located along the first dimension such that at least a part of both/all of them are contained within a plane extending perpendicular to the first dimension. Optionally, the first and second bearing members could be located along the first dimension such that the (lines of the) resultant reaction forces on each individual bearing member (e.g. the first and second bearing members) are substantially co-located along the first dimension, e.g. such that said (lines of the) resultant reaction forces of the bearing members cross said common line not more than 50 mm away from each other measured along the first dimension, for instance not more than 25 mm, for example not more than 10 mm, optionally not more than 5 mm, optionally not more than 2 mm.

A bearing member could comprise an air bearing. In this case, a bearing member could comprise at least one air bearing pad which engages a bearing surface on the bearing guideway. Optionally, the air bearing pad comprises a substantially planar bearing surface. Optionally, the first and second bearing member each comprise at least one air bearing pad. Optionally, the at least one air bearing pad of the first and/or second bearing members is preloaded against a corresponding first and/or second air bearing surface (for example planar air bearing surface) on the bearing guideway. As will be understood, a bearing member could comprise multiple bearing elements (e.g. multiple air bearing pads) mounted to the movable member via a common mount.

As will be understood, other types of bearing members could be used in addition to/alternatively to air bearings. For example, mechanical bearings, for example roller bearings, plain/journal bearings, and/or ball-race bearings could be used.

As will be understood, the first dimension can be a linear dimension.

As will be understood, the first and second bearing members can cooperate with/bear against different bearing surfaces (e.g. first and second bearing surfaces) of the bearing guideway.

Optionally, the apparatus is configured such that resultant reaction forces on the first and second bearing members extend substantially orthogonal to each other (at least in the two-dimensional coordinate system). In other words, the lines (e.g. directions/vectors) of the resultant reaction forces on the bearing members (e.g. the line of the resultant reaction force on the first bearing member and the line of a resultant reaction force on the second bearing member) can extend substantially orthogonal to each other (at least in the two-dimensional coordinate system).

Optionally, the apparatus is configured such that resultant reaction forces on the first and second bearing members extend substantially perpendicularly to the first dimension (e.g. perpendicularly to the common line). The lines (e.g. directions/vectors) of the resultant reaction forces on the bearing members (e.g. the line of the resultant reaction force on the first bearing member and the line of a resultant reaction force on the second bearing member) can extend substantially perpendicularly to the first dimension (e.g. perpendicularly to the common line).

Optionally, the apparatus is configured such that the preload (e.g. the preload force(s) which provide the preload) is predominantly (and optionally, substantially) reacted by the at least first and/or second bearing members of the bearing assembly(ies) (e.g. first and/or second bearing assemblies) located at the first end of the moveable member.

As will be understood, the apparatus can comprise at least one preload effecting member providing a resultant preload force. The preload effecting member could comprise a bearing member (in other words the preload effecting member could be a "preload bearing member"). For example, the preload effecting member could comprise an air bearing member, which could comprise at least one air bearing pad. The preload effecting member could be mounted to the moveable member. The preload effecting member could cooperate with and/or be biased against a part of the positioning apparatus, for example the (first) bearing guideway. For example, optionally, the preload effecting member comprises a bearing member biased against a third surface of the (first) bearing guideway.

There could be provided at least one preload effecting member for each of said bearing assemblies. For example, the first bearing assembly could comprise at least one preload effecting member, and the second bearing assembly could comprise at least one preload effecting member. In other words, the apparatus could comprise at least one first preload effecting member providing a resultant preload force for preloading the first and second bearing members (in other words the first and second bearing members of the first bearing assembly), and at least one second preload effecting member providing a resultant preload force for preloading the third and fourth bearing members (in other words the first and second bearing members of the second bearing assembly). Optionally, there could be provided at least one preload effecting member shared between multiple bearing assemblies. For example, the at least one preload effecting member could be located part-way between first and second bearing assemblies. Regardless of the location of the preload effecting member along the first dimension, it can be preferred that the preload force is applied to the first and/or second bearing members substantially at the point that the first and/or second bearing members are located along the first dimension; for example is applied at a point not more than 10 mm away from the location of the resultant reaction force of the first and/or second bearing members measured along the first dimension, optionally not more than 5 mm, optionally not more than 2 mm.

Optionally, the resultant preload force is applied such that it does not impart any substantial bending moment into the moveable member and/or bearing members.

Optionally, at least in said two dimensional coordinate system, the line of the resultant preload force extends non-parallel to the resultant reaction forces of the first and second bearing members. In other words, the line of the resultant preload force can intersect the resultant reaction forces of the first and second bearing members.

Optionally, at least in said two dimensional coordinate system, the line of the resultant preload force can extend substantially through the point at which the resultant reaction forces of the first and second bearing members intersect, for example such that the preload force can predominantly be resolved directly into and along the lines of the resultant reaction forces on the first and second bearing members. This can be such that the preload force does not impart any substantial bending moment into the moveable member and/or bearing members. In other words, the preload can be applied (to the moveable member) such that the preload is predominantly (and optionally, substantially) reacted by the (at least first and second) bearing members (of the at least first bearing assembly) located at the first end of the moveable member.

Optionally, the line of the resultant preload force, which provides the preload on the first and second bearing members, can extend close to or through the point at which the resultant reaction forces of the first and second bearing members intersect, and/or can extend close to or through said common line. The line of the resultant preload force which provides the preload on the first and second bearing members can extend non-parallel to the lines of the resultant reaction forces on the first and second bearing members. The line of the resultant preload force could cross close to or through the common line, e.g. substantially perpendicularly to the common line. Optionally, the line of the resultant preload force, extends through a region which is centred on the point at which the resultant reaction forces on the first and second bearing members intersect, and which has a radius equal to the distance between said point and the closest point on the farthest bearing surface of said first and second bearing members.

The first, second and/or third bearing surfaces could be substantially planar surfaces. The first, second and/or third bearing surfaces could be substantially planar air bearing surfaces. The planes of the first, second and/or third bearing surfaces could be non-parallel. Optionally, the planes of the first and second bearing surfaces extend substantially perpendicular to each other. For example, the plane of the first bearing surface can extend substantially horizontal and the plane of the second bearing surface can extend substantially vertically. Optionally, the plane of the third bearing surface extends at an angle to both the first and second surfaces. Optionally, the acute angle of the plane of the third bearing surface is between 25° to 85° to the horizontal, for example between 35° to 65° to the horizontal. For example, optionally the acute angle of the plane of the third bearing surface is at least 45° to the horizontal.

Optionally, the point at which said resultant reaction forces of the first and second bearing members intersect (e.g. in said two dimensional coordinate system) could be substantially coincident with a corner feature of the structure of the moveable member, e.g. such that the resultant reaction forces can be resolved into the side faces of the moveable member. In other words, said common line could be substantially coincident with a corner of the structure of the moveable member, e.g. such that the resultant reaction forces can be resolved into the side faces of the moveable member. Optionally, the resultant preload force could be configured to be directed toward said corner. The line of the resultant preload force could be configured to cross the resultant reaction forces of the first and second bearing members substantially at said corner. The preload effecting member could be configured such that it is mounted to the both sides of the corner feature. The corner could be defined by (adjoining) planar load bearing members, e.g. at their junction/intersection.

The apparatus could be configured such that the resultant reaction forces on the first and second bearing members and the line of the resultant preload force are directed so as to converge toward a common region or point, e.g. so as to intersect each other at substantially the same point. Optionally, the apparatus could be configured such that in three dimensions (e.g. in a (notional) three dimensional coordinate system) the resultant reaction forces on the first and second bearing members, and the line of the resultant preload force are directed so as to converge toward a common region or point, e.g. so as to intersect each other at substantially the same point.

The moveable member can comprise one or more sheets or plates of material configured to provide a load bearing structure of the moveable member (e.g. a sheet/plate material load bearing structure). Accordingly, the load bearing structure can comprise at least first and second (e.g. adjoining) planar load bearing members/facets. The at least first and second planar load bearing members/facets can be non-parallel, for example substantially orthogonal. The apparatus can be configured such that said resultant reaction forces (to the preload force) on the first and second bearing members are carried predominantly along the (e.g. shear) plane(s) of the sheets or plates of material (e.g. of said first and second adjoining planar load bearing members respectively). The first and second bearing members can be mounted end-on to said planar load bearing members. Optionally, the (e.g. line of the) resultant reaction force of a bearing member (e.g. of the first and/or second bearing member) is substantially parallel to the plane of its respective planar load bearing member (to which it is mounted). Optionally, the (e.g. line of the) resultant reaction force of a bearing member (e.g. of the first and/or second bearing member) is substantially parallel to the plane of the sheet/plate to which it is mounted (e.g. substantially parallel to the plane of its respective planar load bearing member). Optionally the line of the resultant reaction force of a bearing member is substantially contained within a volume defined by the main planar surfaces of its respective planar load bearing member (to which it is mounted). Optionally the line of the resultant reaction force of a bearing member is substantially contained within a volume defined by the main planar surfaces of the sheet or plate of material to which it is mounted (e.g. defining said planar load bearing member).

The at least one sheet or plate of material can be arranged to form a box load-bearing structure, for example a substantially closed box load-bearing structure. As will be understood, the planar load-bearing members of a closed box load-bearing structure need not necessarily be solid sheets/plates. For example, they can comprise opening/holes therein. For example, a side of the closed box could comprise a planar lattice structure, and/or plurality of strips of sheet or plate material arranged to provide a planar load bearing configuration. Accordingly, a closed box load-bearing structure can comprise a load-bearing structure comprising a plurality of planar load-bearing members arranged such that there is at least one planar load bearing member on each side of the load-bearing structure.

Optionally, the at least first and second planar load bearing members comprise predominately (optionally, substantially) solid sheet/plate material. Optionally, all sides of the closed box load-bearing structure comprise predominately (optionally, substantially) solid sheet/plate material.

The apparatus can be configured such that the point at which the resultant reaction forces of the first and second bearing members intersect (e.g. in said two dimensional coordinate system) is located substantially at or within a corner of the moveable member, for example a corner defined by the one or more sheets or plates of material. For example, the apparatus can be configured such that the common line can located substantially at or within a corner of the moveable member, for example a corner defined by the one or more sheets or plates of material.

In other words, the apparatus can be configured such that the point at which the resultant reaction forces of the first and second bearing members intersect, e.g. in said two dimensional coordinate system, (or such that the common line) is located substantially at or within the intersection/junction of said first and second planar load bearing members (e.g. within a 50 mm radius centred on the intersection/junction of said first and second planar load bearing members, optionally within a 25 mm radius, for example within a 10 mm radius, for instance within a 5 mm radius, such as within a 2 mm radius). For example, optionally the point at which the resultant reaction forces of the first and second bearing members intersect, e.g. in said two dimensional coordinate system, (or the common line) is substantially located substantially within a notional area/elongate volume defined by the intersection of a first pair of planes containing the front and back surfaces of the first planar load bearing member with a second pair of planes containing the front and back surfaces of the second planar load bearing member. Optionally, the point at which the resultant reaction forces of the first and second bearing members intersect, e.g. in said two dimensional coordinate system, (or the common line) is located within a greater notional area/elongate volume which is centred on said notional area/elongate volume, but the height and width of which is up to five (preferably up to three) times greater than the notional area/elongate volume (taken in the two-dimensional coordinate system/ second and third dimensions perpendicular to the first dimension). Optionally, the point at which the resultant reaction forces of the first and second bearing members intersect, e.g. in said two dimensional coordinate system, (or the common line) is located within a greater notional area/ elongate volume which is centred on the notional area/ elongate volume, but having an (e.g. cross-sectional) area of which is up to 2500% (preferably up to 900%) greater than that of the notional area/elongate volume.

Likewise, the apparatus can be configured such that the line of the resultant preload force extends through substantially through the intersection/junction of said first and second planar load bearing members (e.g. within a region centred on the intersection/junction of said first and second planar load bearing members, and having a radius of not more than 50 mm, for example not more than 25 mm, optionally not more than 10 mm, for instance not more than 5 mm, such as not more than 2 mm). For example, optionally the line of the resultant preload force passes through the notional area/elongate volume. Optionally the line of the resultant preload force passes through the greater notional area/elongate volume.

The preload effecting member can be mounted to the first and/or second planar load bearing members (e.g. via a mounting member, such as an arm/bracket). The preload effecting member can be mounted proximal to, or substantially at, the corner/intersection/junction/interface of the first and second planar load bearing members. In other words, the preload bearing member can be mounted via a load spreader member which is secured to both the first and second planar load bearing members. The load spreader member can be secured to a face (e.g. inside face) of the first and second planar load bearing members, (e.g. over an expanse of the surfaces of the first and second planar load bearing members, for example over at least 1 cm², for instance over at least 5 cm², such as over at least 10 cm², optionally over at least 25 cm² of each of the first and second planar load bearing members).

The positioning apparatus can be configured such that the preload force imparts substantially no bending moment into the moveable member and bearing members. In other words, the positioning apparatus can be configured such that the predominant force imparted into the moveable member and bearing members by the preload force is compression.

The moveable member can comprise a beam, for example a substantially horizontally-extending beam.

Optionally, the moveable member (e.g. the beam) carries a carriage which is moveable along the beam in a second dimension, (e.g. perpendicular to the first dimension). Optionally, the carriage carries a quill (or column) which is moveable relative to the carriage in a third dimension (e.g. perpendicular to the first and second dimensions).

The positioning apparatus can comprise a coordinate positioning apparatus, for example a coordinate measuring machine (CMM).

As will be understood, a bearing member can comprise a bearing part (e.g. an air bearing pad) which cooperates with a corresponding bearing surface (e.g. of a rail, track, guideway), and a mount part which mounts the bearing part to the moveable member. The mount part could comprise a substantially straight member extending (and centred) along the line of the reaction force between the bearing part and the point at which it is mounted to the moveable member.

As will be understood, there could be provided at least a second (e.g. datum) bearing assembly at the first end of the moveable member which is displaced axially along the first dimension with respect to the first (e.g. datum) bearing assembly comprising said at least first and second bearing members. The second (e.g. datum) bearing assembly could be substantially the same as or similar to the first bearing assembly described above. The second (e.g. datum) bearing assembly could comprise at least first and second bearing members (which could be referred to as "third and fourth bearing members") which are preloaded against the bearing guideway (e.g. against the same bearing surface(s) against which the first and second bearing members of the first bearing assembly cooperate with, for example against corresponding first and second bearing surfaces of the bearing guideway). The at least first and second bearing members of the second bearing assembly could be preloaded against the bearing guideway, such in that in a two dimensional coordinate system perpendicular to the first dimension, the resultant reaction force on the first bearing member (of the second bearing assembly) and the resultant reaction force on the second bearing member (of the second bearing assembly) intersect. In other words the apparatus can be configured such that the resultant reaction force on the first bearing member (of the second bearing assembly) and the resultant reaction force on the second bearing member (of the second bearing assembly) converge, and/or substantially intersect each other, and/or intersect a common line (which could be referred to as the "common line of the second bearing assembly", or "second common line") that extends parallel to the first dimension outside of the bearing guideway. As will be understood, the point, in the two dimensional coordinate system, at which the resultant reaction forces of the bearing members of the first bearing assembly intersect, and the point, in the two dimensional coordinate system, at which the resultant reaction forces of the bearing members of the second bearing assembly intersect, need not be the same, although in some circumstances it could be preferable if they are substantially the same (e.g. such that the point of intersection of the bearing members of the second bearing assembly falls within a notional region centred on the point of intersection of the bearing members of the first bearing assembly and having a radius of 50 mm, for example 25 mm, for instance 10 mm, optionally 5 mm, such as 2 mm). Accordingly, as will be understood, the first and second common lines (that is the common line of the first bearing assembly and the common line of the second bearing assembly), need not necessarily be the same line, e.g. they need not necessarily be coincident/coaxial. Optionally, the first and second common lines are substantially the same, e.g. optionally they are substantially coincident/coaxial.

As will be understood, the moveable member could comprise at least one further bearing member at a second end distal to the first end. The at least one further bearing member could be configured to bear against a bearing surface of a further/second guideway. The at least one further bearing member at the second end of the moveable member could comprise an air bearing and/or mechanical bearing, for example.

The cooperation of the (e.g. the first and second) bearing members of the first bearing assembly with the bearing guideway could constrain the lateral position of the moveable member in the dimensions perpendicular to the first dimension. The cooperation of the (e.g. the first and second) bearing members of the second bearing assembly with the bearing guideway could constrain the rotational position of the moveable member about at least two axes (e.g. about axes perpendicular to the first dimension). The cooperation of the at least one further bearing member at the second end of the moveable member with the second guideway could constrain the rotational position of the moveable member about at least one axis (e.g. about an axis parallel to the first dimension, for example about the common line).

According to a second aspect of the invention there is provided a positioning apparatus comprising a moveable member moveable along a (e.g. first) bearing guideway in a first dimension, the moveable member comprising at a first end thereof at least a first bearing assembly comprising at least first and second bearing members which are preloaded against corresponding first and second sides of a concave corner feature of the bearing guideway.

According to a third aspect of the invention there is provided a positioning apparatus comprising a moveable member moveable along a bearing guideway in a first dimension, the moveable member comprising at a first end thereof at least first and second bearing members which are preloaded against corresponding first and second bearing surfaces of the bearing guideway, configured such that the resultant reaction force to the preload on the first bearing member and the resultant reaction force to the preload on the second bearing member converge.

The positioning apparatus could be a coordinate positioning apparatus, for example a coordinate measuring machine (CMM), for example a Cartesian CMM.

Embodiments of the invention will now be described, by way of example only, with reference to the following drawings, in which.

Figure 1:
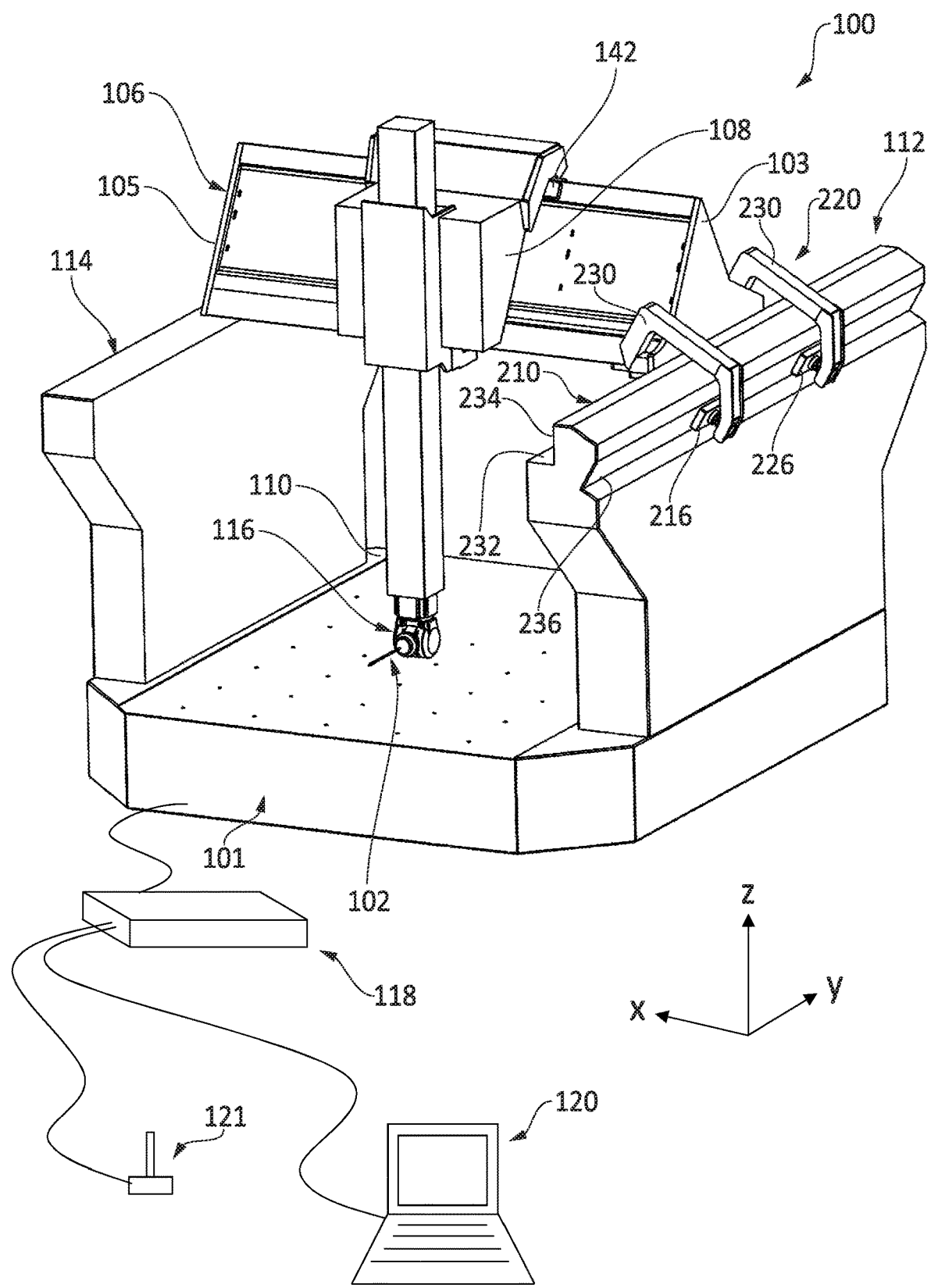
FIG. 1 is a schematic isometric view of the front of a gantry-type CMM according to the present invention.

An overview of an example embodiment of how the invention can be implemented will be described below. In this example, the invention is implemented as part of a CMM 100. FIG. 1 shows a CMM 100 with its protective housings/covers (e.g. "main" covers/"hard" covers) removed so that the relevant components of the CMM 100 can be seen.

As shown, a tool, for example an inspection device such as a probe 102 for inspecting a workpiece, can be mounted on the CMM 100. In the embodiment shown, the probe 102 is a contact probe, in particular a contact analogue scanning probe, for measuring the workpiece by a stylus of the probe contacting the workpiece. However, as will be understood the CMM 100 could carry any sort of inspection device, including touch-trigger probes, non-contact (e.g. optical) probes, or another type of instrument if desired.

In the embodiment shown, the CMM 100 is a gantry-style Cartesian CMM and comprises a platform 101 on which an artefact to be inspected can be placed, and a movement system which provides for repeatable and accurate control of the position of the probe 102 relative to the platform 101 in three orthogonal dimensions X, Y and Z.

In particular, the movement system comprises a cross-beam 106, a carriage 108, and a quill 110. The cross-beam 106 extends between first 112 and second 114 raised guideway/rail members and is configured to move along the guideways/rails in a first dimension (in this case along a Y axis) via a bearing arrangement (in this embodiment an air bearing arrangement) described in more detail below. The carriage 108 sits on and is carried by the cross-beam 106, and is moveable along the cross-beam in a second dimension (in this case along an X axis) via a bearing arrangement (in this embodiment an air bearing arrangement). The quill 110 is held by the carriage 108, and is moveable relative to the carriage 108 in a third dimension (in this case along a Z axis) via a bearing arrangement (again, in this embodiment via an air bearing arrangement).

As will be understood, motors (not shown), for example direct drive motors such as linear motors, can be provided for effecting the relative motion of the various members along their axis. Also, position encoders (not shown) can be provided for reporting the position of the cross-beam 106, carriage 108 and/or quill 110.

In the particular example shown, an articulated head 116 is provided on the lower free end of the quill 110 for carrying the probe 102. In this case, the articulated head 116 comprises two orthogonal rotational axes. Accordingly, in addition to the three orthogonal linear dimensions X, Y and Z, the probe 102 can be moved about two orthogonal rotational axes (e.g. A and B axes). A machine configured with such an articulated head is commonly known as a 5-axis machine.

Articulated heads for tools and inspection devices are well known, and for example described in WO2007/093789. As will be understood, an articulated head need not necessarily be provided, and for example the probe 102 could be mounted to the quill assembly 110 via a fixed head which does not provide any rotational degrees of freedom. Optionally, the probe itself can comprise an articulated member so as to facilitate rotation about at least one axis.

As is standard with measuring apparatus, a controller 118 can be provided which is in communication with the CMM's motors and position encoders (not shown), the articulated head 116 (if present) and the probe 102 so as to send and/or receive signals to and/or from them so as to control the motion of the relatively moveable members as well as receive feedback and measurement data. A computer 120, e.g. a personal computer (which can be separate to or integrated with the controller 118) can be provided which is in communication with the controller 118. The computer 120 can provide a user friendly interface for an operator to, for example, program and initiate measurement routines. Suitable computers and associated control/programing software is widely available and well known. Furthermore, a joystick 121 or other suitable input device can be provided which enables an operator to manually control the motion of the probe 102. Again, such joysticks are well known and widely available.

Figure 3:
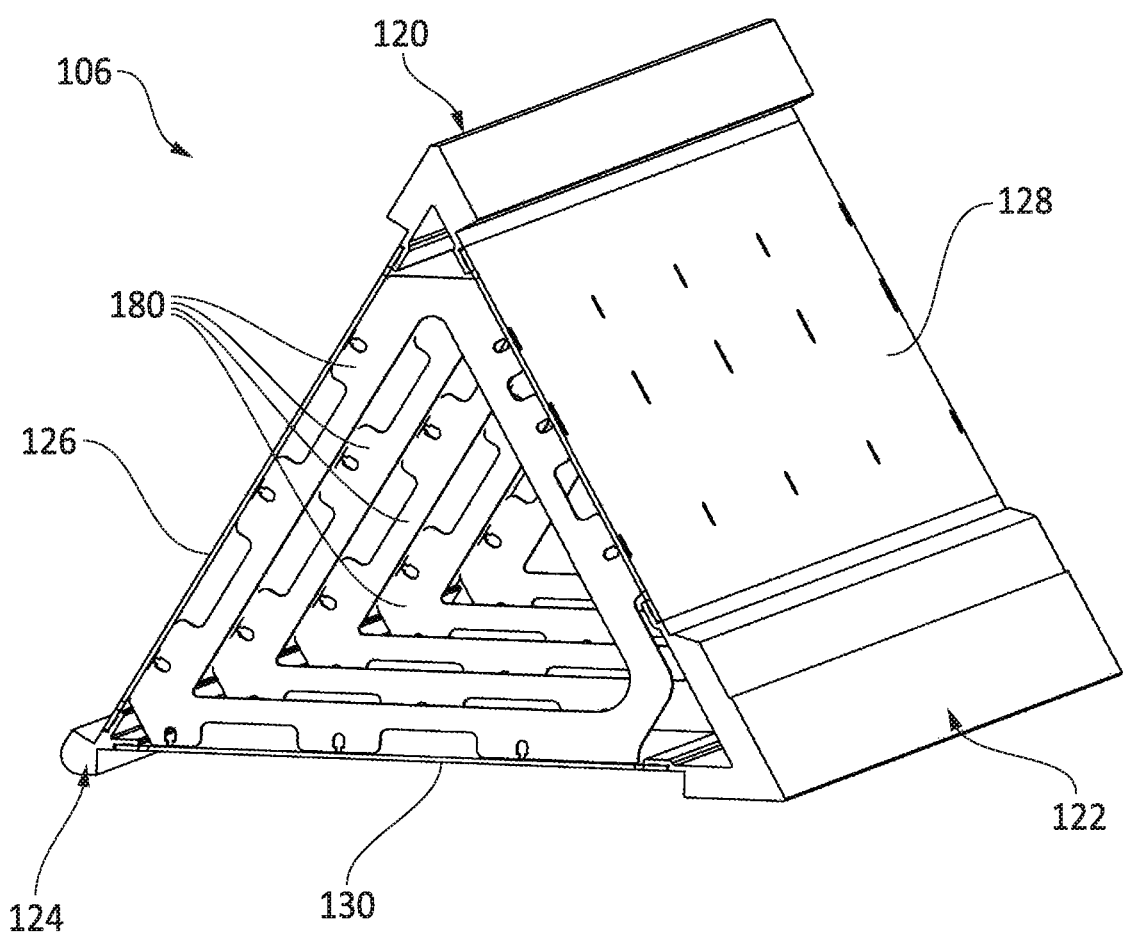
FIG. 3 is a schematic isometric view of the cross-beam of the CMM of FIG. 1.

The structure of the cross-beam 106 will be described in more detail with reference to FIG. 3. As shown, in this embodiment the cross-beam 106 comprises a box beam. The box beam 106 has a modular construction, and in this embodiment comprises three elongate corner members 120, 122, 124, and three pieces of sheet material 126, 128, 130, each forming a planar load bearing member of the box beam, and each extending between a pair of the three elongate corner members. In the embodiment described, the three elongate corner members 120, 122, 124 are extruded. In the embodiment described, the thickness of the three pieces of sheet material 126, 128, 130 is not more than 3 mm. They are made from a metallic material, in this embodiment aluminium, although as will be understood other metallic materials such as stainless steel could be used, or non-metallic materials such as carbon fibre or ceramic could be used. To reduce bulk and weight, it can be preferred that the planar load bearing members of the box beam are formed from sheet material no thicker than 5 mm (above which they would typically, and in any case for the purpose of this document, are described as "plates" rather than "sheets"). In the described embodiment, the three elongate corner members 120, 122, 124 and the three pieces of sheet material 126, 128, 130 are formed from the same material type (e.g. aluminium).

In the described embodiment, the first 120 and second 122 elongate corner member provides bearing surfaces against which the carriage's air bearings (e.g. 140, 142 shown in FIGS. 1 and 2) can bear. As shown, bulkheads 180 are, in the described embodiment, provided to aid assembly of the corner members 120, 122, 124 and the pieces of sheet material 126, 128, 130 of the cross-beam 106. The bulkheads 180 can also provide some additional strength to the cross-beam 106. In the described embodiment, the bulkheads are pop/blind riveted "end-on" to the first 126, second 128 and third 130 pieces of sheet material (e.g. as opposed to a folded flap on the bulkheads). This ensures that loads which are directed orthogonally into the first 126, second 128 and third 130 pieces of sheet material are primarily carried along the shear plane of the bulkhead 180 enabling them to be made from thinner sheets of material (thereby saving weight).

Figure 2:
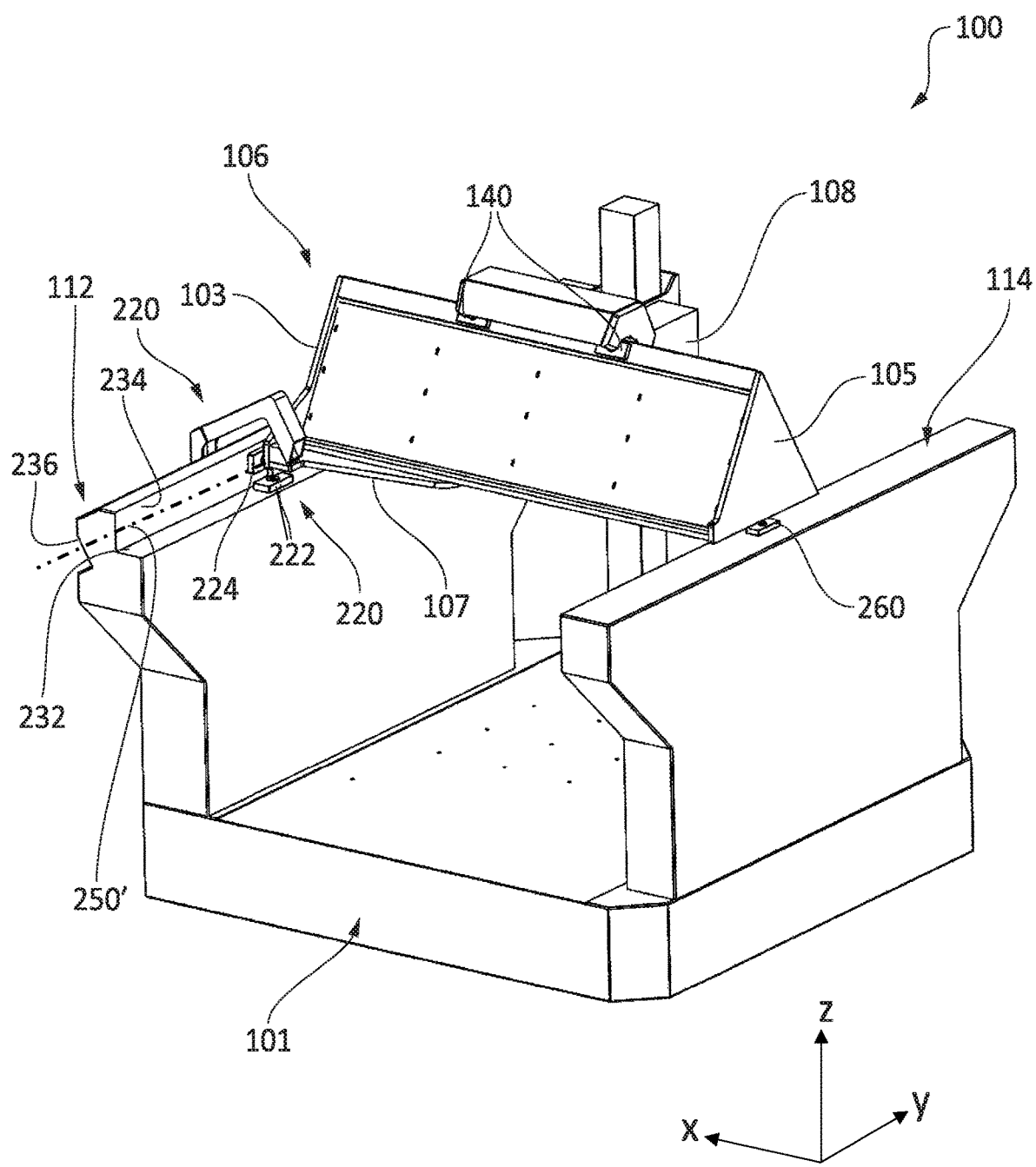
FIG. 2 is a schematic isometric view of the rear of the CMM of FIG. 1.

As shown in FIGS. 1 and 2 (but not FIG. 3) the cross-beam 106 also comprises first 103 and second 105 end plates, and a bottom plate 107 each providing a planar load bearing member. The first 103 and second 105 end plates, and the bottom plate 107 have a thickness of 15 mm and so are substantially thicker than the first 126, second 128 and third 130 pieces of sheet material. As described in more detail below, in the present embodiment, the cross-beam's air bearings are mounted to these plates/planar load bearing members 103, 105, 107.

In the described embodiment, the various pieces of the beam 106 are glued together using adhesive. For example, the first 120, second 122 and third 124 elongate corner members are glued to the first 126, second 128 and third 130 pieces of sheet material (e.g. via an appropriate adhesive, such as a single part, heat cured, epoxy, for example PERMABOND® ES569 available from Permabond Engineering Adhesives Limited). Also, the bulkheads 180 can be glued to the first 126, second 128 and third 130 pieces of sheet material (e.g. using the same adhesive). Furthermore, the first 103 and second 105 end plates, can be glued to the first 126, second 128 and third 130 pieces of sheet material as well as to the first 120, second 122 and third 124 elongate corner members (e.g. using the same adhesive). Likewise, the bottom plate 107 can be glued to the third piece of sheet material 130 (e.g. using the same adhesive). As will be understood, other techniques can be used to secure the parts of the cross-beam together in addition or alternatively to gluing, such as for example welding and/or using mechanical fasteners.

The bearing arrangement of the cross-beam 106 will now be described in more detail. Particular reference is made to FIGS. 5 to 9 which show end and cross-sectional views of the apparatus in two dimensions (X, Z) perpendicular to the first dimension (Y). In other words, FIGS. 5 to 9 depict the apparatus, and the relevant forces of the Y-axis bearing arrangement, as viewed in/projected into a (notional) two-dimensional coordinate system perpendicular to the first dimension.

As shown, in FIGS. 1, 2 and 4 to 7, the cross-beam 106 comprises first 210 and second 220 datum bearing assemblies at a first end of the cross-beam 106. The first 210 and second 220 bearing assemblies are positioned at separate locations along the first dimension. For example, the first 210 bearing assembly is located toward a first side (e.g. front side) of the cross-beam 106, and the second 220 bearing assembly is located toward a second side (e.g. back side) of the cross-beam).

Each datum bearing assembly 210, 220 comprises a plurality of bearings members which bear against the first guideway/rail 112. In the described embodiment, each bearing assembly 210, 220 comprises a pair of datum bearing members, each comprising an air bearing pad and a mount for mounting the air bearing pad to the cross-beam 106. Furthermore, in this embodiment, at least one preload (bias) bearing member is provided for preloading (in other words "biasing") the datum bearing members against the first raised guideway/rail 112 as explained in more detail below. As will be understood, such preloading/biasing could be provided by additional or other means, including the reliance on gravity and/or magnetic forces.

Figure 5:
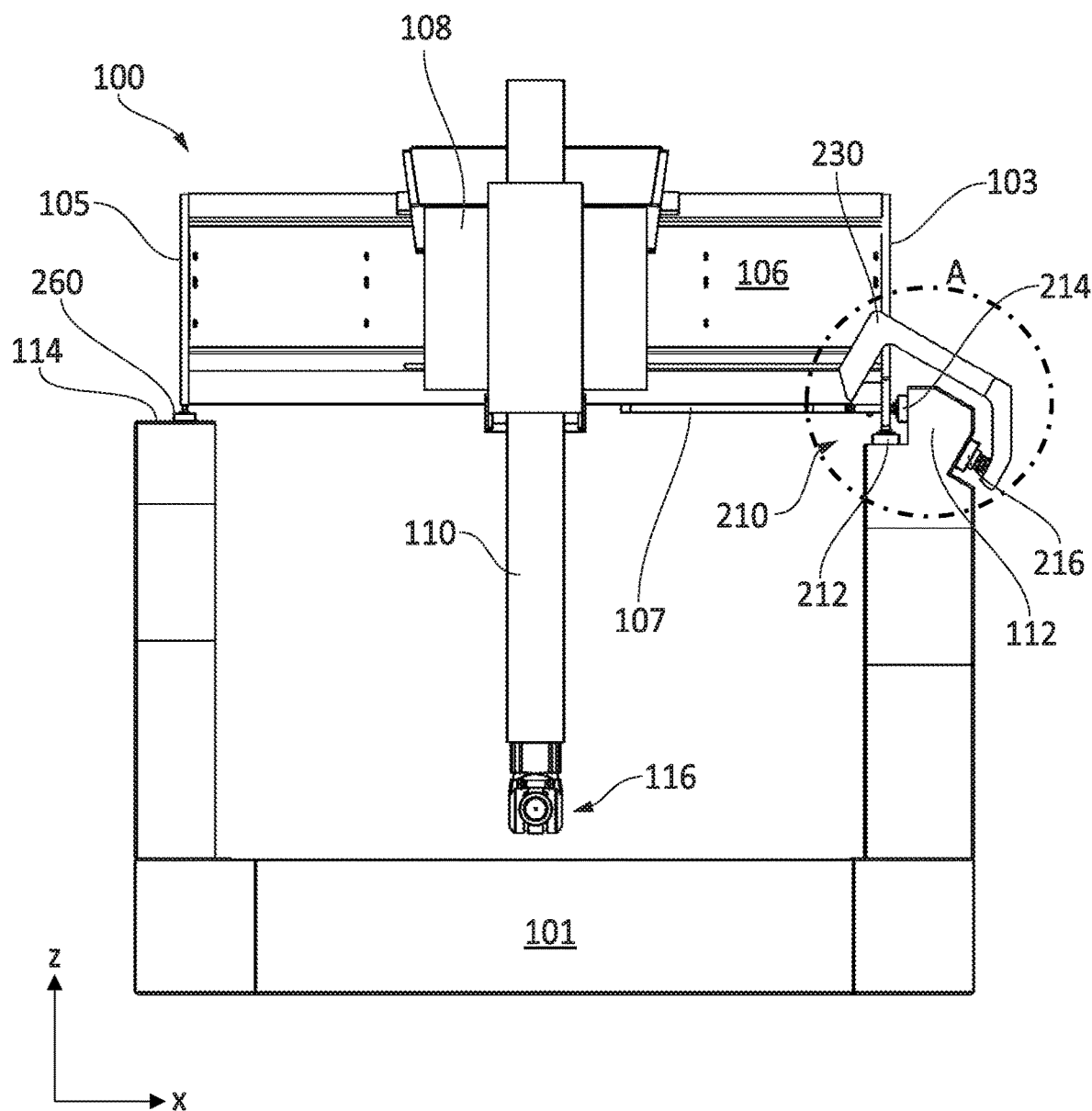
FIG. 5 is a schematic elevation view of the end of the CMM of FIG. 1.
Figure 6:
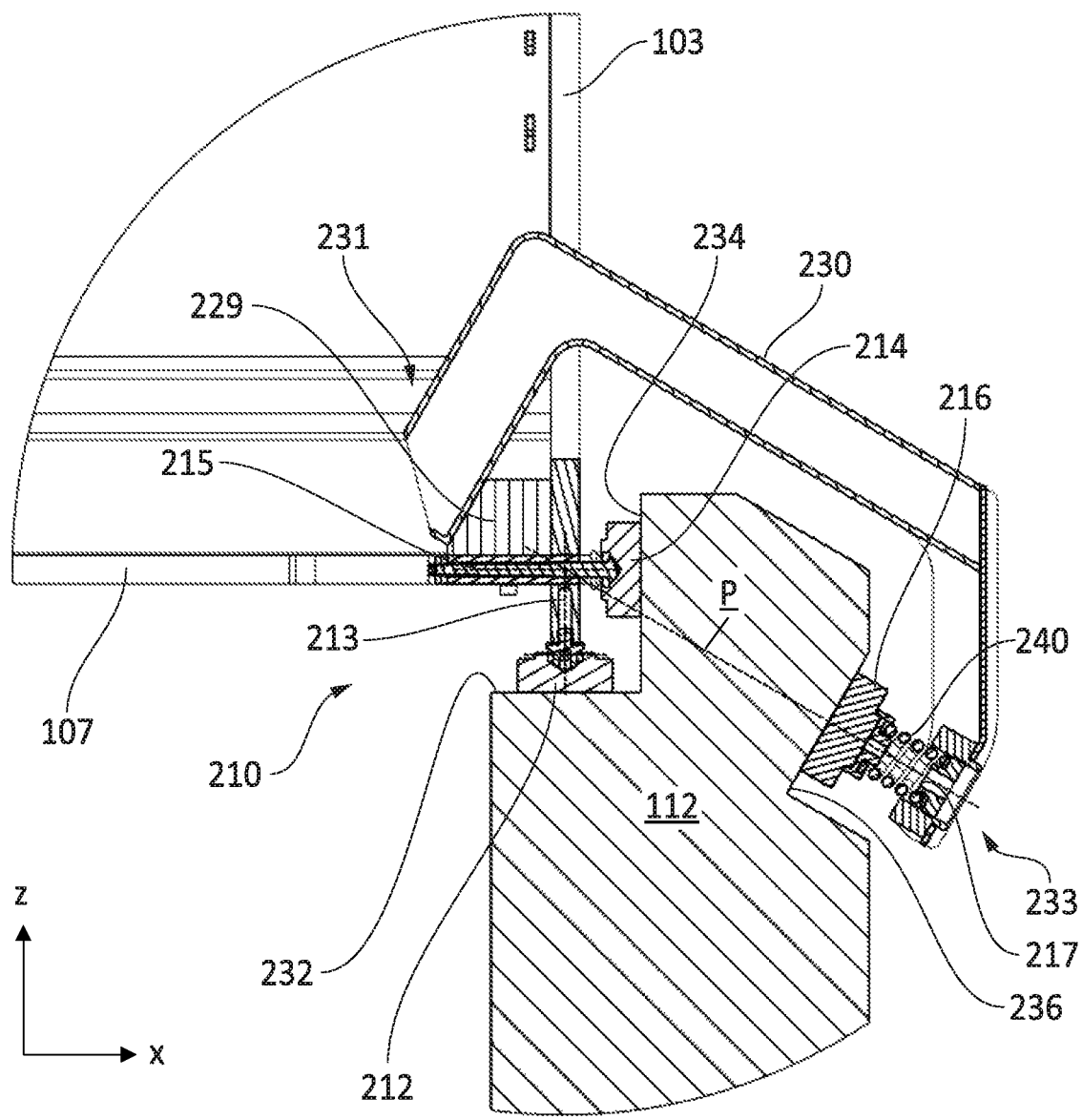
FIG. 6 is a detail cross-sectional view of the region A identified in FIG. 5.
Figure 7:
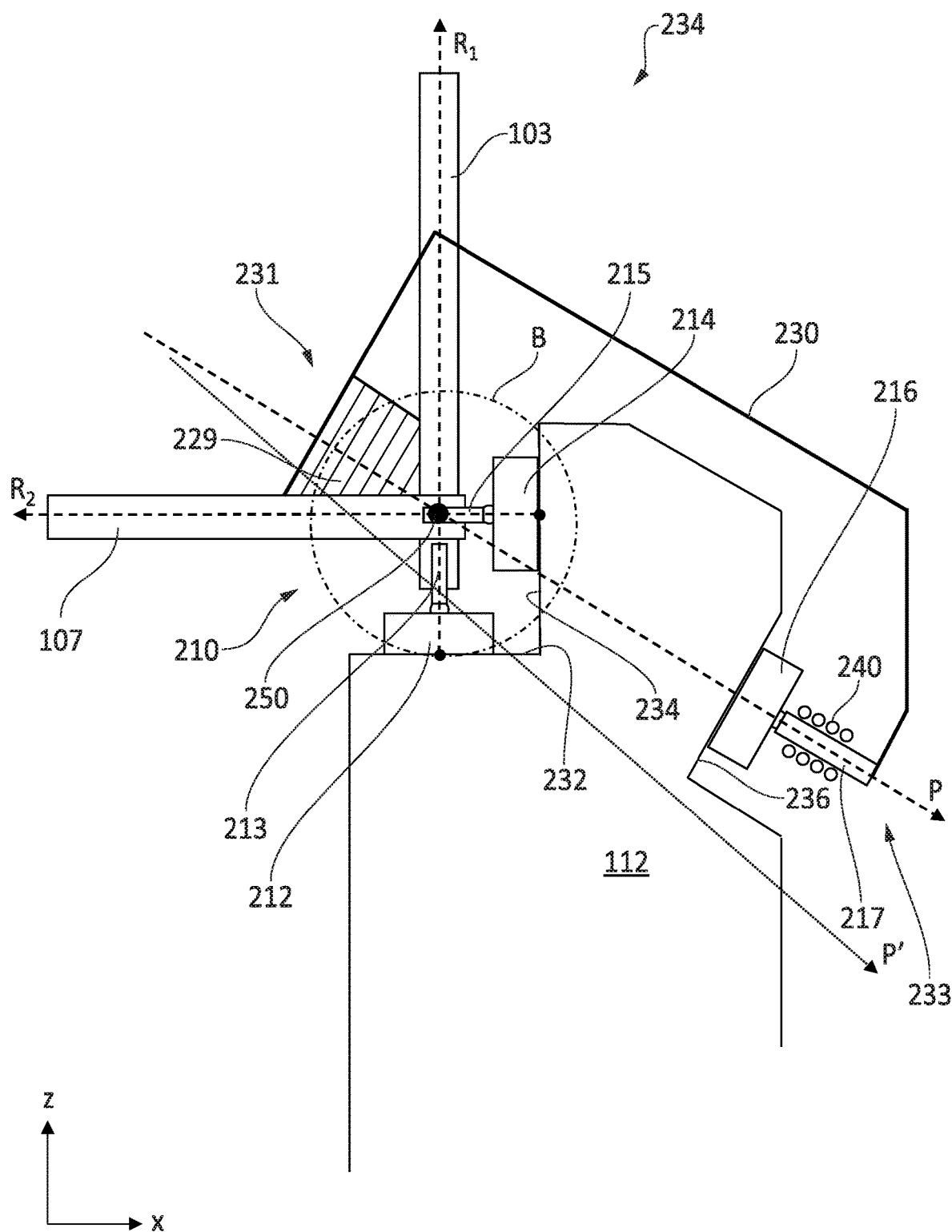
FIG. 7 is a schematic representation of FIG. 6 illustrating the interaction of the bearing resultant reaction forces and preload force.

With reference to FIGS. 1, 5 and 6, the first bearing assembly 210 comprises first 212, second 214 datum air bearing pads. As shown in FIGS. 6 and 7, the first 212 and second 214 datum air bearing pads bear against corresponding first 232 and second 234 planar air bearing surfaces of a concave corner feature provided on the first guideway/rail 112. As also shown in FIGS. 6 and 7, the first bearing assembly 210 comprises first 213 and second 215 mount members respectively for the first 212 and second 214 datum air bearing pads. In this embodiment, each datum bearing assembly 210, 220 comprises a corresponding preload bearing member. Accordingly, as shown, for the first bearing assembly 210, there is provided a third air bearing pad 216 which bears against a third 236 planar air bearing surface provided on the first guideway/rail 112, and a corresponding third mount member 217.

In the present embodiment, each of the first 213, second 215 and third 217 mount members comprise a ball-joint at their interface with their respective air bearing pad so that the air bearing pad is free to rotate with respect to the mount (e.g. so as to accommodate any deviations in the air bearing surface).

The first 212 air bearing pad is mounted to the first end plate/planar load bearing member 103 via its mount member 213 such that it is fixed linearly with respect to the first end plate/planar load bearing member 103 (i.e. in the X, Y and Z dimensions). The second 214 air bearing pad is mounted to the bottom plate/planar load bearing member 107 via its mount member 215 such that it is fixed linearly with respect to the first end plate/planar load bearing member 107 (i.e. in the X, Y and Z dimensions).

The third air bearing pad 216 is mounted to the first end plate/planar load bearing member 103 and the bottom plate/planar load bearing member 107 at their interface via an arm/bracket 230. A first end 231 of the arm/bracket 230 is mounted to the cross-beam 106 at the interface of the first end plate/planar load bearing member 103 and the bottom plate/planar load bearing member 107, and at a second end 233 to the third mount member 217. In particular, the third air bearing pad 216 is mounted to the cross-beam 106 via a load spreader 229 which is connected to the inside surfaces of both of the first end plate/planar load bearing member 103 and the bottom plate/planar load bearing member 107. Furthermore, the third mount member 217 comprises a spring 240 configured to urge the third air bearing pad 216 into the third bearing surface 236 so as to preload the first 212 and second 214 datum air bearings into their respective first 232 and second 234 air bearing surfaces, with a force of approximately 500N (shared between the first and second datum air bearings). Accordingly, the third air bearing pad 216 can be referred to as a "preload" air bearing pad.

As shown, (particularly in FIG. 7) the bearing arrangement, for example the first 232 and second 234 surfaces and the first 212 and second 214 air bearings are configured such that, in the notional two dimensional coordinate system that is perpendicular to the first dimension as depicted in FIGS. 5 to 9, the line $R_1$ of the resultant reaction force on the first 212 bearing member and the line $R_2$ of the resultant reaction force on the second 214 bearing member converge, and in particular intersect each other at a point 250 outside the first guideway/rail 112 (on the same side of the guideway 112 as the first 212 and second 214 air bearings). As will be understood, if the first 212 and second 214 air bearings were offset along the first dimension, then the line $R_1$ of the resultant reaction force on the first 212 bearing member and the line $R_2$ of the resultant reaction force on the second 214 bearing member would intersect a common line 250' that is located outside of the first guideway/rail 112 (on the same side of the guideway 112 as the first 212 and second 214 air bearings) and that extends parallel to the direction along which the cross-beam 106 moves (i.e. parallel to the Y-axis). Furthermore, in this embodiment, the third surface 236 and the third air bearing pad 216 are configured such that in said notional two dimensional coordinate system, the line $R_1$ of the resultant reaction force on the first 212 bearing member, the line $R_2$ of the resultant reaction force on the second 214 bearing member and the line of the resultant reaction force P converge and intersect at the common point 250 (which in this case is within the junction of the first end plate/planar load bearing member 103 and the bottom plate/planar load bearing member 107). If the preload force were offset along the Y-axis, the line of the resultant preload force P would intersect the common line 250'. Furthermore, the arm 230 is connected to the cross-beam 106 at a point which lies on the line P of the preload force. With the arrangement shown, the preload force imparts substantially no bending or rotational moment forces into any part of the cross-beam 106 or the first bearing assembly 210. In particular, the preload force P can be resolved directly along the lines of the resultant reaction forces $R_1$, $R_2$ and only compressive forces are imparted in the first end plate 103, bottom plate 107 and the first 213 and second 215 mount members as a result of the preload.

As described above, the resultant preload force P intersects the resultant reaction forces $R_1$, $R_2$ of the first and second bearing members at the common point 250. However, as will be understood, this need not necessarily be the case, and they could converge towards a common point, even if they do not all intersect each other at the same point. Indeed, as shown in FIG. 7 by the dotted line P', the resultant preload force P' could be angled non-parallel to both the resultant reaction forces $R_1$, $R_2$ of the first and second bearing members. In this case, the system is configured such that it is adequate if the resultant preload force P' extends through region which is centred on the point 250 at which the resultant reaction forces $R_1$, $R_2$ on the first and second bearing members intersect, and which has a radius equal to the distance between said point 250 and the closest point on the farthest bearing surface of the first and second bearing members (which in this case is the first bearing member 212 and first bearing surface 232). Such a region is schematically identified by the dashed circle "B" in FIG. 7.

Figure 4:
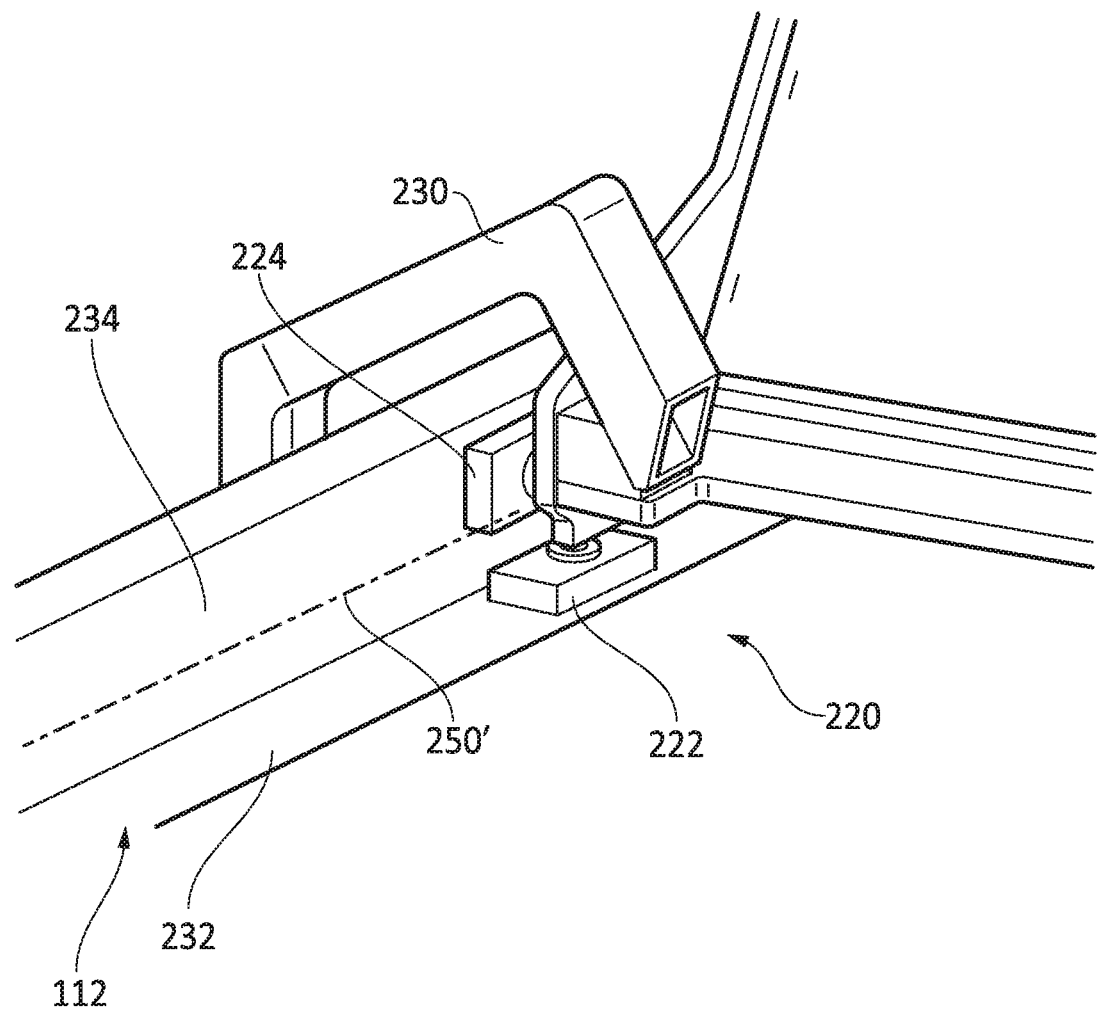
FIG. 4 is a schematic isometric view of a bearing assembly of the bridge of the CMM of FIG. 1.

The second bearing assembly 220 is identical to the first bearing assembly 210, and for example as shown in FIGS. 1, 2 and 4 comprises first 222, second 224 and third 226 air bearing pads which are mounted to the cross-beam 106.

As shown in FIGS. 2 and 5, a single air bearing pad 260 is provided at the other end of the cross-beam 106 which is mounted to the second end plate 105, and bears against a planar air bearing surface provided on the second raised guideway/rail 114.

The first 212, 222 and second 214, 224 air bearings of the first 210 and second 220 bearing assemblies, are notionally referred to herein as "datum" air bearings, because it is the cooperation of those air bearings with the first guideway that controls the lateral position of the cross-beam 106. In contrast, the air bearing 260 which bears against the second raised rail 114 merely controls/constrains the rotational position of the cross-beam 106 about the first raised rail 112. Accordingly, the air bearing 260 which bears against the second raised rail 114 could notionally be referred to as an "outrigger" bearing member.

In the embodiment described above, each of the first 210 and second 220 datum air bearing assemblies comprise a single corresponding preload bearing pad (216, 226) which is co-located along with Y-axis with respect to its corresponding first (212, 222) and second (214, 224) datum air bearing pads. However, as will be understood, this need not necessarily be the case. For example, two or more preload air bearing pads (e.g. spaced along the Y-axis) could be mounted to the arm/bracket 230.

Optionally, there could be provided just a shared (e.g. single) preload air bearing pad for the first 210 and second 220 datum air bearing assemblies. For example, a single preload air bearing pad could be provided which bears against the third 236 planar air bearing surface at a point between the first 210 and second 220 datum bearing assemblies along the Y-axis. If bending moments are to be minimised/avoided from being introduced into the cross-beam 106, then the shared/single preload air bearing pad could be mounted at the interface of the first end plate 103 and the bottom plate 107 at the points along the Y-axis at which the first 210 and second 220 datum bearing assemblies are mounted. For example, a single arm/bracket 230 such as that shown in FIGS. 5 and 6 could be provided, and a bar could extend along the Y-axis and be secured to the first end plate 103 and the bottom plate 107 at their interface, at the points along the Y-axis at which the first 210 and second 220 datum bearing assemblies are mounted thereto.

In the above embodiment, each datum bearing assembly comprises only one air bearing pad which cooperates with the first 232 planar air bearing surface and only one air bearing pad which cooperates with the second 234 planar air bearing surface. However, as will be understood, this need not necessarily be the case, and for example a datum bearing assembly could comprise two or more air bearing pads which engage the first 212 planar air bearing surface and/or could comprise two or more air bearing pads which engage the second 234 planar air bearing surface. In this case, the two or more air bearing pads could share a common mount member for mounting to the cross-beam 106.

Figure 8:
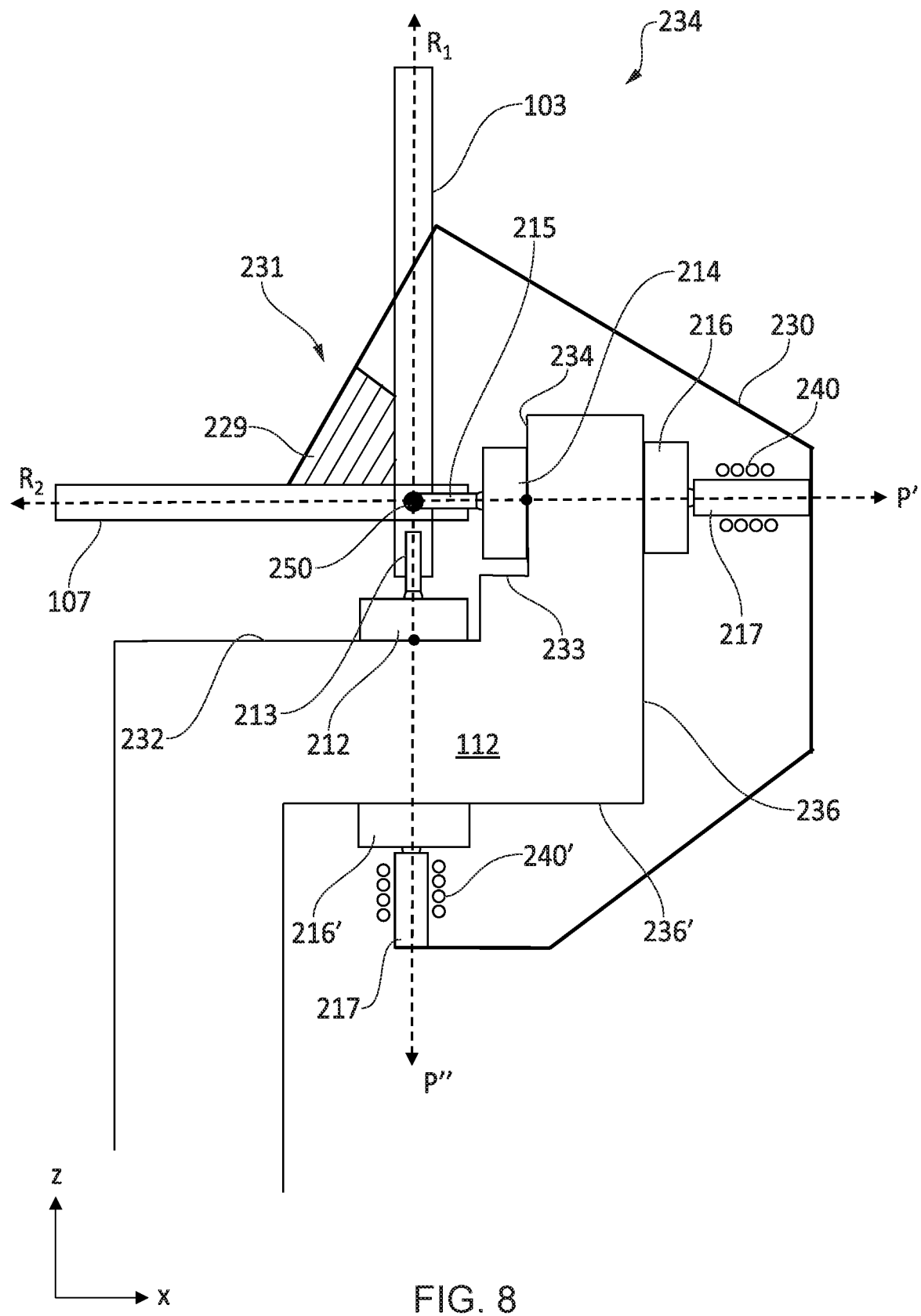
FIG. 8 is a schematic representation of a bearing arrangement according to alternative embodiment of the invention.

FIG. 8 shows an alternative embodiment of a bearing assembly, which is similar to the embodiment described above in connection with FIG. 7 and like parts share like reference numerals. However, in this embodiment, in addition to the above described first 212, second 214 and third 216 air bearing pads there is provided a fourth 216' air bearing pad. The third 216 and fourth 216' air bearing pads are mounted to the first end plate 103 and the bottom plate 107 at their interface via an arm 230 which at a first end 231 is mounted to the cross-beam 106 at the interface of the first end plate 103. As with the embodiment of FIG. 7, the third 216 air bearing pad is mounted to the arm via a third mount member 217 which comprises a spring 240. In this embodiment, the fourth 216' air bearing pad is mounted to the arm via a fourth mount member 217' which also comprises a spring 240'. The springs 240, 240' of the third 217 and fourth 217' mount members are configured to urge the third 216 and fourth 216' air bearing pads into third 236 and fourth 236' bearing surfaces so as to preload the first 212 and second 214 air bearings into their respective first 232 and second 234 air bearing surfaces which form a concave corner feature of the guideway 112.

FIG. 8 also illustrates that the surfaces 232, 234 which form the concave corner feature of the guideway 112 do not need to meet; as shown an intermediate feature, such as a step 233, could be located between them. This is also the case for the other described embodiments, and not just for the embodiment of FIG. 8.

In the embodiment of FIG. 8, the third 216 and fourth 216' air bearing pads are connected to the cross-beam 106 via a common arm/bracket 230. However, as will be understood this need not necessarily be the case; for example they could be connected to the cross-beam 106 via a common arm/bracket 230 via separate arms. Furthermore, the first 212 and second 214 air bearings need not be substantially co-located along the Y-axis. Nevertheless, in this case, to minimise bending moments introduced into the moveable member, it can be preferred to substantially co-locate along the Y-axis the first 212 air bearing and its corresponding preload air bearing (i.e. the fourth 216' air bearing), and also to co-locate along the Y-axis the second 214 air bearing and its corresponding preload air bearing (i.e. the third 216 air bearing).

Figure 9:
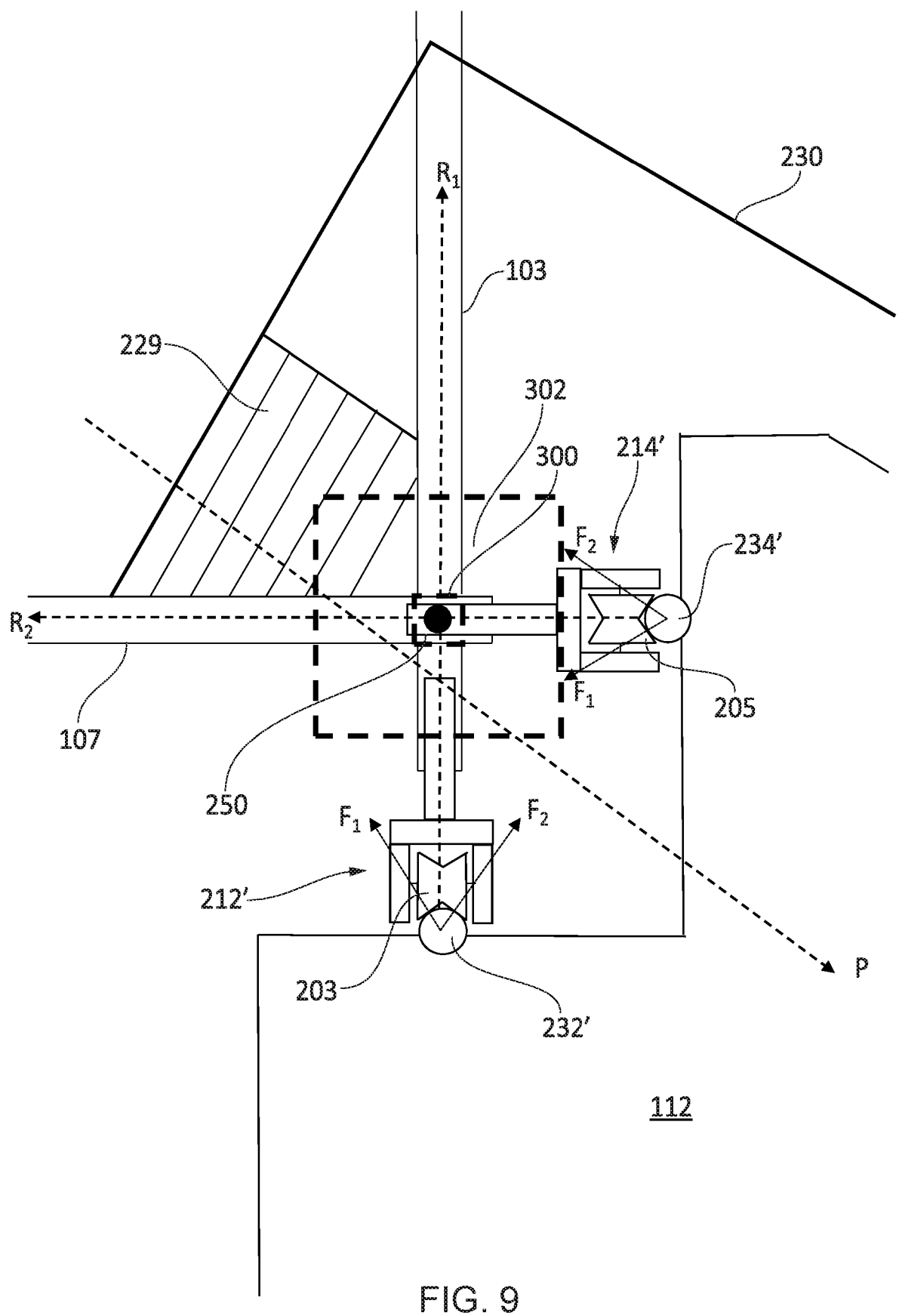
FIG. 9 is a schematic representation of a bearing arrangement according to another alternative embodiment of the invention.

In the embodiments described, the bearing assembly comprises an air bearing. However, as will be understood, the invention is also applicable to non-air bearing assemblies. For example, mechanical bearings, such as wheel, or ball race bearings, could be used. FIG. 9 schematically illustrates an embodiment which is substantially the same as the embodiments described above in connection with FIGS. 1 to 8, but in which the first 212 and second 214 air bearing pads have been replaced by first 212' and second 214' wheel bearings, each comprising a wheel 203, 205. Furthermore, first 232' and second 234' cylindrical bearing rods are mounted on the first guideway 112 against which the first 212' and second 214' wheel bearings are preloaded by the preload force P (which could be provided in the same way as disclosed above in connection with FIGS. 1 to 8). As shown, there are two direct reaction forces $F_1$ and $F_2$ to the preload on each wheel. However, as shown, these direct reaction forces result in the same resultant reaction forces $R_1$ and $R_2$ as those of the embodiments of FIGS. 1 to 8.

FIG. 9 also illustrates how that whilst it can be preferred for the resultant reaction forces R1, R2 and the preload force P to all pass through a notional area/elongate volume 300 defined by the intersection of a first pair of planes containing the front and back surfaces of the plate of material defining the first planar load bearing member 103 with a second pair of planes containing the front and back surfaces of the sheet or plate of material defining the second planar load bearing member 107, it can be sufficient for the resultant reaction forces $R_1$, $R_2$ and the preload force P to all pass substantially through the intersection/junction of the first 103 and second 107 planar load bearing members, for example with a notional greater area/elongate volume 302, which is centred on the notional area/elongate volume 300, but the height and width of which is up to five times greater than the notional area/elongate volume 300. Also, as shown in FIG. 8, whilst the resultant reaction forces $R_1$, $R_2$ and the resultant preload force P do not all meet or intersect each other at a common point, they do all substantially converge towards a common point/region, e.g. the junction of the first 103 and second 107 planar load bearing members. This is also the case for the other described embodiments, and not just for the embodiment of FIG. 9.

As will be understood, the invention and design principles thereof is also applicable to other parts of the CMM 100 (e.g. to the quill 110), and also to other types of CMM, including bridge, column, horizontal arm and cantilevered CMMs (as a non-exhaustive list). The invention is also not limited to CMMs, but is applicable to other positioning apparatus including machine tools.

The invention claimed is:

1. A positioning apparatus comprising a moveable member moveable along a bearing guideway in a first dimension, the moveable member comprising at a first end thereof at least first and second bearing members which are preloaded against corresponding first and second bearing surfaces of the bearing guideway, configured such that in a two dimensional coordinate system perpendicular to the first dimension, the resultant reaction force to the preload on the first bearing member and the resultant reaction force to the preload on the second bearing member intersect.

2. A positioning apparatus as claimed in claim 1, comprising at least one preload effecting member providing a resultant preload force which, in said two dimensional coordinate system, extends non-parallel to the resultant reaction force on the first bearing member and non-parallel to the resultant reaction force on the second bearing member.

3. A positioning apparatus as claimed in claim 2, in which the preload effecting member comprises a bearing member biased against a third surface of the bearing guideway.

4. A positioning apparatus as claimed in claim 2, configured such that, the resultant reaction forces on the first and second bearing members, and the line of the resultant preload force are directed so as to substantially converge toward a common point.

5. A positioning apparatus as claimed in claim 1, in which the moveable member comprises one or more sheets or plates of material configured to provide a load bearing structure comprising first and second planar load bearing members.

6. A positioning apparatus as claimed in claim 5, configured such that said resultant reaction force on the first bearing member and said resultant reaction force on the second bearing member are respectively substantially aligned with and carried predominantly along the planes of said first and second planar load bearing members.

7. A positioning apparatus as claimed in claim 5, in which the first and second planar load bearing members are adjoining, and in which the apparatus is configured such that, in said two dimensional coordinate system, the lines of the resultant reaction forces are directed so as to substantially converge toward the junction of first and second planar load bearing members.

8. A positioning apparatus as claimed in claim 2, configured such that the lines of the resultant reaction forces and the line of the resultant preload force are directed so as to substantially converge toward the junction of the first and second planar load bearing members.

9. A positioning apparatus as claimed in claim 2 in which the preload effecting member is mounted to both the first and second planar load bearing members.

10. A positioning apparatus as claimed in claim 5, in which for said first and/or second bearing member, its resultant reaction force is substantially parallel to the plane of its respective planar load bearing member, and optionally contained within a volume defined by the main planar surfaces of the sheet or plate of material defining said planar load bearing member.

11. A positioning apparatus as claimed in claim 1, in which at least in said two dimensional coordinate system, the point at which the resultant reaction forces intersect is located substantially at or within a corner feature of the moveable member.

12. A positioning apparatus as claimed in claim 1, in which the positioning apparatus comprises a coordinate positioning apparatus, for example a coordinate measuring machine.

13. A positioning apparatus as claimed in claim 1, comprising at least a second bearing assembly comprising at least third and fourth bearing members which are preloaded respectively against the first and second bearing surfaces of the bearing guideway, configured such that the resultant reaction force to the preload on the third bearing member and the resultant reaction force to the preload on the fourth bearing member intersect at least in said two dimensional coordinate system.

14. A positioning apparatus as claimed in claim 13, in which in said two dimensional coordinate system, the point at which the resultant reaction forces of the first and second bearing members intersect and the point at which the resultant reaction forces of the third and fourth bearing members intersect are substantially coincident.

15. A positioning apparatus comprising a moveable member moveable along a bearing guideway in a first dimension, the moveable member comprising at a first end thereof at least first and second bearing members which are preloaded against corresponding first and second sides of a concave corner of the bearing guideway.

16. A positioning apparatus comprising a moveable member moveable along a bearing guideway in a first dimension, the moveable member comprising at a first end thereof at least first and second bearing members which are preloaded against corresponding first and second bearing surfaces of the bearing guideway, configured such that the resultant reaction force to the preload on the first bearing member and the resultant reaction force to the preload on the second bearing member converge.

17. A positioning apparatus as claimed in claim 12, in which the moveable member comprises a horizontally-extending beam which carries a carriage that is moveable along the beam in a second dimension, the carriage carrying a quill which is moveable relative to the carriage in a third dimension.

18. A positioning apparatus as claimed in claim 2, in which the point at which said resultant reaction forces of the first and second bearing members intersect is located substantially at or within a corner feature of the structure of the moveable member, the corner feature being defined by adjoining first and second planar load bearing members, and wherein the preload effecting member is mounted to the first and/or second planar load bearing members substantially at the corner feature.

* * * * *